(12) United States Patent
Chen

(10) Patent No.: US 10,003,939 B2
(45) Date of Patent: Jun. 19, 2018

(54) METHOD OF PROVIDING DTMF-BASED INTERACTIVE TEXT RESPONSE SERVICES

(71) Applicant: ACER INCORPORATED, New Taipei (TW)

(72) Inventor: Pei-Jung Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days. days.

(21) Appl. No.: 15/297,139

(22) Filed: Oct. 19, 2016

(65) Prior Publication Data

US 2017/0215050 A1  Jul. 27, 2017

Related U.S. Application Data

(60) Provisional application No. 62/287,446, filed on Jan. 27, 2016.

(30) Foreign Application Priority Data

Jul. 18, 2016  (TW) .............................. 105122547 A

(51) Int. Cl.
  *H04W 4/00*  (2018.01)
  *H04W 4/14*  (2009.01)
  *H04M 7/12*  (2006.01)

(52) U.S. Cl.
  CPC ........... *H04W 4/14* (2013.01); *H04M 7/1295* (2013.01)

(58) Field of Classification Search
  CPC ...................................................... H04W 4/14
  See application file for complete search history.

(56) References Cited

U.S. PATENT DOCUMENTS

| 6,601,031 B1* | 7/2003 | O'Brien | H04M 3/533 |
| | | | 379/88.18 |
| 2004/0203652 A1 | 10/2004 | Yan | |
| 2008/0279176 A1* | 11/2008 | Cheng | H04L 12/66 |
| | | | 370/352 |
| 2017/0201630 A1* | 7/2017 | Gopalakrishnan | H04M 15/8033 |

OTHER PUBLICATIONS

3GPP TS 24.008, "3rd Generation Partnership Project; Technical Specifacation Group Core Network and Terminals; Mobile radio interface Layer 3 specification; Core network protocols; Stage 3(Release 13)," V13.4.0.2015/12,pp. 250,289,290,392,539.

* cited by examiner

Primary Examiner — Justin Lee
(74) Attorney, Agent, or Firm — Winston Hsu

(57) ABSTRACT

In a wireless communication system, when receiving a START DTMF message with an ITR indicator from a transmitting device, a network is configured to send a START DTMF ACK message to the transmitting device. After adjusting its settings and entering a text receiving mode, the transmitting device is configured to send a CONFIRM START DTMF TXT message to the network. The network is configured to send keypad information associated with the number of a receiving device to the receiving device. The receiving device is configured to send the corresponding text message to the network, which then forwards the text message to the transmitting device.

11 Claims, 2 Drawing Sheets

METHOD OF PROVIDING DTMF-BASED INTERACTIVE TEXT RESPONSE SERVICES

CROSS REFERENCE TO RELATED APPLICATIONS

This application claims the benefit of U.S. provisional application No. 62/287,446 filed on 2016 Jan. 27.

BACKGROUND OF THE INVENTION

1. Field of the Invention

The present invention is related to a method of providing interactive text response services, and more specifically, to a method of providing DTMF-based interactive text response services.

2. Description of the Prior Art

Dual-tone multi-frequency (DTMF) signaling is an in-band telecommunication signaling system using the voice-frequency band over telephone lines between telephone equipment and other communications devices and switching centers for identifying the number dialed by a user. DTMF signaling involves a high frequency group and a low frequency group each including 4 audio frequencies. One audio frequency from the high frequency group and one audio frequency from the low frequency group are transmitted in pairs to represent one of 16 DTMF signals corresponding to the digits, letters or symbols dialed by the user.

Interactive voice response (IVR) is a value-added service based on the existing DTMF telecommunication system. Originally implemented on phone servers, IVR allows a user to control a user interface by voice commands or keypad commands. For example, many banks, credit card centers or telecommunications service providers offer an interactive voice response system (IVRS) so as to provide automatic phone inquiry services. After dialing the designated number, a customer may enter the system. After selecting an appropriate option or inputting personal information according to system instructions, the customer may access pre-recorded messages or specific data (such as account balance or credit card bill), or perform certain transactions (such as making a money transfer, changing personal password or changing contact details).

In mobile communication applications, multiple channels are established between a mobile device and a base station. In GSM (Global System for Mobile Communications) systems as an example, voice channels and digital channels including fast associated control channels (FACCHs) are established between a mobile device and a base station. When a user pushes a button of the mobile device, corresponding DTMF data is transmitted from the mobile device to the base station, which then generates and sends a corresponding analog voice message to a receiving device so as to respond to user commands.

In a prior art IVR system based on existing DTMF structure, when a user dials the number designated by a specific institution, the specific institution may reply a voice message via the receiving device. However, the user may not be able to memorize all contents of the voice message and thus need to replay the voice message or record the content of the voice message. Therefore, there is a need for method of providing DTMF-based interactive text response (ITR) services.

SUMMARY OF THE INVENTION

The present invention provides a method of providing DTMF-based ITR services. The method includes a transmitting device sending a dual-tone multi-frequency start message which includes an ITR indicator to a network; the network sending a dual-tone multi-frequency start acknowledgement message to the transmitting device; the transmitting device adjusting a setting for entering a text-receiving mode; the transmitting device sending a dual-tone multi-frequency text-receiving confirmation message to the network; and the network sending keypad information associated with a user command to a receiving device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
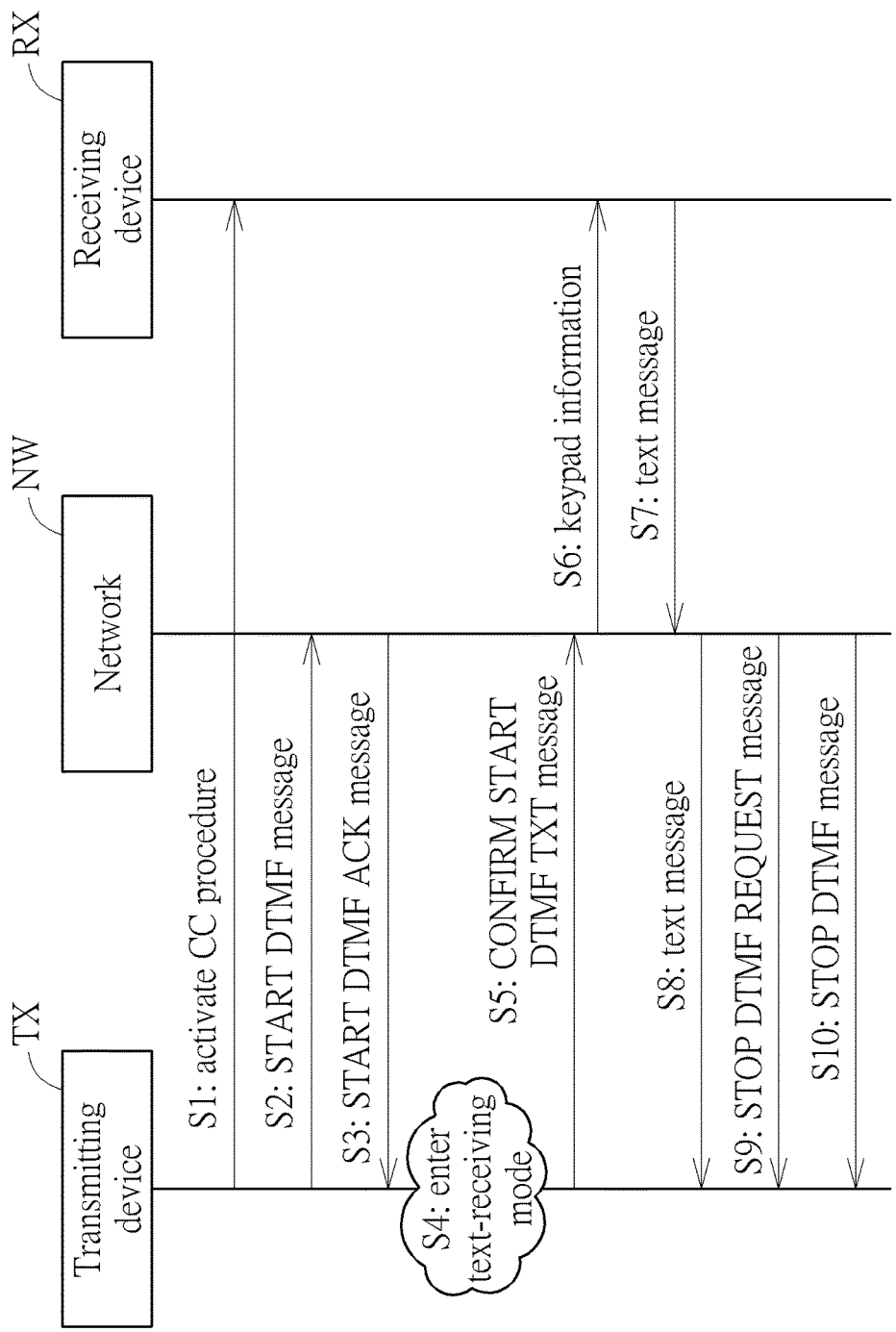
FIG. 1 is a flowchart illustrating a method of providing DTMF-based ITR services.

FIG. 1 is a flowchart illustrating a method of providing DTMF-based ITR services. The illustrated steps S1~S10 may be applied to a DTMF wireless communication system which includes a transmitting device TX, a network NW and a receiving device RX.

Step S1: The transmitting device TX operating in a voice mode activates a call control (CC) procedure for dialing to the receiving device RX.

Step S2: The transmitting device TX sends a dual-tone multi-frequency start (START DTMF) message which includes an ITR indicator to the network NW.

Step S3: The network NW sends a dual-tone multi-frequency start acknowledgement (START DTMF ACK) message to the transmitting device TX.

Step S4: The transmitting device TX adjusts a setting for entering a text-receiving mode.

Step S5: The transmitting device TX sends a dual-tone multi-frequency text-receiving confirmation (CONFIRM START DTMF TXT) message to the network NW.

Step S6: The network NW sends keypad information associated with the number of the receiving device RX to the receiving device RX.

Step S7: The receiving device RX sends a text message associated with the keypad information to the network NW.

Step S8: The network NW sends the text message associated with the keypad information to the transmitting device TX.

Step S9: The network NW sends a dual-tone multi-frequency stop request (STOP DTMF REQUEST) message to the transmitting device TX.

Step S10: The network NW sends a dual-tone multi-frequency stop (STOP DTMF) message to the transmitting device TX.

In an embodiment, the transmitting device TX may be a mobile phone, a personal digital assistant (PDA), a handheld computer, a tablet computer, a nettop computer, a laptop computer, or any portable device with network ability and text-receiving function. In another embodiment, the transmitting device TX may be a desktop computer, a set-up box, a network appliance, or any stationery device with network ability and text-receiving function. However, the type of transmitting device TX does not limit the scope of the present application.

In an embodiment, the receiving device RX may be any host or server adopted by a commercial institution which provides ITR services. However, the type of the receiving device RX does not limit the scope of the present application.

In an embodiment, the network NW may be any cellular type network under 3rd Generation Partnership Project (3GPP) structure, such as 2G, 2.5G, 3G or 4G networks. In another embodiment, the network NW may be any wireless network under Internet protocol (IP) structure, such as wireless local area network (WEAN) or wireless fidelity (Wi-Fi) networks. However, the type of the network NW does not limit the scope of the present application.

In the present invention, the term "network NW" may refer to hardware and/or software, or any combination thereof provided as a part of the wireless communication system for handling DTMF protocols. For example, a 2G-based network NW may include a base transceiver station (BTS) and a base station controller (BSC), a 3G-based network NW may include a node B and a radio network controller (RNC), and a 4G-based network NW may include an evolved node B and an RNC. However, the implementation of the network NW does not limit the scope of the present application.

The present method of providing ITR services is based on existing DTMF structure which is defined in related 3GPP specification and well-known to those skilled in the art. For concise description of the present invention, only the inventive steps related to ITR services are addressed in detail hereafter.

In step S1, the transmitting device TX operating in the voice mode is configured to activate the CC procedure for dialing the number of the receiving device RX. In an embodiment of the present invention, the number of the receiving device RX is associated with a text message of a specific operation and may be designated by any commercial institution which provides ITR services. According to related 3GPP specifications (such as TS 24.008), after a user dials the number of the receiving device RX using the transmitting device TX, the CC procedure may further includes receiving setup messages, receiving call processing messages, informing current task of handling mobile originated (MO) calls, assigning channels, or selecting Codes. However, the method of preforming the CC procedure does not limit the scope of the present invention.

In step S2, the transmitting device TX is configured to send the START DTMF message which includes an ITR indicator to the network NW. According to related 3GPP specifications (such as TS 24.008), the START DTMF message includes 4 types of information elements (IE): call control protocol discriminator IE, transaction identifier IE, START DTMF message type IE, and keypad facility IE. The length of the call control protocol discriminator IE and the transaction identifier IE is equal to either one or two octets. The length of the START DTMF message type IE is equal to one octet. The length of the keypad facility IE is equal to two octets.

Figure 2:
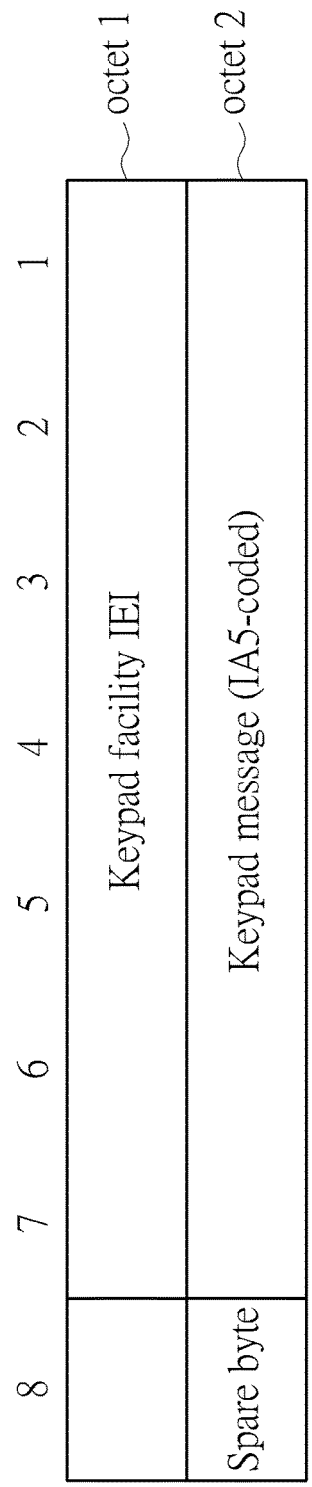
FIG. 2 is a diagram illustrating a method of including an ITR indicator in the START DTMF message according to an embodiment of the present invention.

FIG. 2 is a diagram illustrating a method of including the ITR indicator in the START DTMF message according to an embodiment of the present invention. According to related 3GPP specifications (such as TS 24.008), the first octet (Octet 1) in the keypad facility IE is used to store a keypad facility information element identifier (keypad facility IEI), bytes 1~7 of the second octet (Octet 2) in the keypad facility IE are used to store IA5-coded keypad message (the user command corresponding to dialing the number of the receiving device RX), and byte 8 of the second octet (Octet 2) in the keypad facility IE is a spare byte. The keypad facility IE is used for transmitting one DTMF digit (0, 1, 2, 3, 4, 5, 6, 7, 8, 9, A, B, C, D, *, #) as one IA5 character.

In an embodiment, the user command corresponding to dialing the number of the receiving device RX may be stored as IA5-coded data in the data bytes (bytes 1~7) of the second octet (Octet 2) in the keypad facility IE, and the ITR indicator may be stored in the spare byte (byte 8) of the second octet (Octet 2) in the keypad facility IE. In another embodiment, since the keypad of most stationary phones and the touch keypad displayed on most mobile phones do not use the letters A, B, C and D, the ITR indicator may be stored as IA5-coded data from any of the unused DTMF signals of the letters A, B, C and D in the data bytes (bytes 1~7) of the second octet (Octet 2) in the keypad facility IE. However, the method of including the ITR indicator in the START DTMF message does not limit the scope of the present invention.

The ITR indicator indicates that the transmitting device TX requests to receive DTMF messages in text form. When determining that the START DTMF message includes the ITR indicator, the network NW is configured to send the START DTMF ACK message to the transmitting device TX in step S3. In an embodiment of the present invention, the START DTMF ACK message includes information associated with the time length required for receiving text messages, and this time information is designated by the network NW.

In step S4, the transmitting device TX is configured to adjust its setting for entering the text-receiving mode in order to receive DTMF messages in text form. In an embodiment of the present invention, the transmitting device TX may activate a timer T1 based on the time information of the START DTMF ACK message. The purpose of the timer T1 is to ensure that the network NW is aware when the transmitting device TX is ready to receive text messages. The operation of the timer T1 will be described in detail in subsequent paragraphs.

In step S5, the transmitting device TX is configured to send the CONFIRM START DTMF TXT message to the network NW so as to inform the network NW that the transmitting device TX is ready to receive text messages. In an embodiment of the present invention, if the transmitting device TX is unable to complete the setting adjustment before the timer T1 expires, a "time extension T2" request may be included in the CONFIRM START DTMF TXT message. Under such circumstance, upon receiving the CONFIRM START DTMF TXT message, the network NW is configured to wait for a time period T2 before proceeding with subsequent steps. In another embodiment of the present invention, if the transmitting device TX is able to complete the setting adjustment before the timer T1 expires, the CONFIRM START DTMF TXT message does not includes any request associated with time extension, or a "time extension T2" request with T2 set to 0 may be included in the CONFIRM START DTMF TXT message. Under such circumstance, upon receiving the CONFIRM START DTMF TXT message, the network NW is configured to proceed with subsequent steps immediately.

In an embodiment of the present invention, if the ITR indicator is stored in bytes 1~7 of the second octet (Octet 2) of the keypad facility IE using unused DTMF digits (A, B, C, D) in step S2, the CONFIRM START DTMF TXT message may further include information corresponding to dialing the number of the receiving device RX.

In step S6, the network NW is configured to send the keypad information associated the number of the receiving device RX to the receiving device RX. In step S7, the receiving device RX is configured to send the text message associated with the keypad information to the network NW. In step S8, the network NW is configured to send the text message associated with the keypad information to the transmitting device TX.

For illustrative purposes, it is assumed that the user dials a number assigned by a bank, a credit card service center or a mobile phone service provider for ITR services in step S1, and then issues a user command according to system instructions in step S2 for inquiring an account balance, inquiring a credit card bill, or making a money transfer. Under such circumstance, the receiving device RX is configured to send a text message showing related information about the account balance, the credit card bill, or the result of the money transfer as requested in step S7. However, the content of the user command in step S2 and the content of the text message in step S7 do not limit the scope of the present invention.

After sending the text message, the network NW is configured to send the STOP DTMF REQUEST message to the transmitting device TX in step S9, and then send the STOP DTMF message to the transmitting device TX in step S10.

The present method of providing ITR services may be performed in the call control procedure adapted in current DTMF wireless communication system. After a user dials a number designated by a specific institution and then issues a user command according to system instructions, the specific institution may send the corresponding text message associated with the user command using the receiving device, wherein the network controls the signal transmission and forwarding. Therefore, the present method of providing DTMF-based ITR services can allow the user to easily browse or record text messages which contain large amount of data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of providing dual-tone multi-frequency-based (DTMF-based) interactive text response (ITR) services, comprising:
 a transmitting device sending a dual-tone multi-frequency start (START DTMF) message which includes an ITR indicator to a network;
 the network sending a dual-tone multi-frequency start acknowledgement (START DTMF ACK) message to the transmitting device;
 the transmitting device adjusting a setting for entering a text-receiving mode;
 the transmitting device sending a dual-tone multi-frequency text-receiving confirmation (CONFIRM START DTMF TXT) message to the network; and
 the network sending keypad information associated with a user command to a receiving device, wherein:
  the START DTMF message includes a call control protocol discriminator information element, a transaction identifier information element, a START DTMF message type information element, and a keypad facility information element;
  the user command is stored as IA5-coded data in a plurality of data bytes of the keypad facility information element; and
  the ITR indicator is stored in a spare byte of the keypad facility information element.

2. The method of claim 1, further comprising:
 the receiving device sending a text message associated with the keypad information to the network;
 the network sending the text message to the transmitting device;
 the network sending a dual-tone multi-frequency stop request (STOP DTMF REQUEST) message to the transmitting device; and
 the network sending a dual-tone multi-frequency stop (STOP DTMF message) to the transmitting device.

3. The method of claim 1, further comprising:
 before sending the START DTMF message, the transmitting device activating a call control procedure in a voice mode for dialing a number of the receiving device; and
 the transmitting device providing the user command after dialing the number of the receiving device.

4. The method of claim 1, wherein:
 the START DTMF ACK message includes time information associated with a time length required for receiving a text messages t; and
 the transmitting device activates a timer based on the time information.

5. The method of claim 1, further comprising:
 the transmitting device including a time extension request in the CONFIRM START DTMF TXT message if the transmitting device is unable to complete adjusting the setting before the timer expires.

6. The method of claim 5, further comprising:
 the network waiting for a time period as indicated by the time extension request upon receiving the CONFIRM START DTMF TXT message before sending the keypad information to the receiving device.

7. A method of claim 1, providing dual-tone multi-frequency-based (DTMF-based) interactive text response (ITR) services, comprising:
 a transmitting device sending a dual-tone multi-frequency start (START DTMF) message which includes an ITR indicator to a network;
 the network sending a dual-tone multi-frequency start acknowledgement (START DTMF ACK) message to the transmitting device;
 the transmitting device adjusting a setting for entering a text-receiving mode;
 the transmitting device sending a dual-tone multi-frequency text-receiving confirmation (CONFIRM START DTMF TXT) message to the network; and
 the network sending keypad information associated with a user command to a receiving device, wherein:
  the START DTMF message includes a call control protocol discriminator information element, a transaction identifier information element, a START DTMF message type information element, and a keypad facility information element;
  the ITR indicator is stored as IA5-coded data in a plurality of data bytes of the keypad facility information element; and
  the user command is stored in the CONFIRM START DTMF TXT message.

8. The method of claim 7, wherein the ITR indicator is stored as IA5-coded data in the plurality of data bytes of the keypad facility information element using a DTMF signal of any of a letter A, a letter B, a letter C and a letter D.

9. A method of providing dual-tone multi-frequency-based (DTMF-based) interactive text response (ITR) services, comprising:
- a transmitting device sending a dual-tone multi-frequency start (START DTMF) message which includes an ITR indicator to a network;
- the network sending a dual-tone multi-frequency start acknowledgement (START DTMF ACK) message to the transmitting device;
- the transmitting device adjusting a setting for entering a text-receiving mode;
- the transmitting device sending a dual-tone multi-frequency text-receiving confirmation (CONFIRM START DTMF TXT) message to the network; and
- the network sending keypad information associated with a user command to a receiving device, wherein:
  - the START DTMF ACK message includes time information associated with a time length required for receiving a text messages t; and
  - the transmitting device activates a timer based on the time information.

10. The method of claim 9, further comprising:
the transmitting device including a time extension request in the CONFIRM START DTMF TXT message if the transmitting device is unable to complete adjusting the setting before the timer expires.

11. The method of claim 10, further comprising:
the network waiting for a time period as indicated by the time extension request upon receiving the CONFIRM START DTMF TXT message before sending the keypad information to the receiving device.

* * * * *